(12) United States Patent
Kawamura et al.

(10) Patent No.: US 8,437,294 B2
(45) Date of Patent: May 7, 2013

(54) MOBILE STATION, BASE STATION, UPLINK TRANSMISSION METHOD, AND DOWNLINK TRANSMISSION METHOD

(75) Inventors: Teruo Kawamura, Yokosuka (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 334 days.

(21) Appl. No.: 12/680,208

(22) PCT Filed: Sep. 26, 2008

(86) PCT No.: PCT/JP2008/067522
§ 371 (c)(1),
(2), (4) Date: May 19, 2010

(87) PCT Pub. No.: WO2009/044686
PCT Pub. Date: Apr. 9, 2009

(65) Prior Publication Data
US 2010/0246512 A1    Sep. 30, 2010

(30) Foreign Application Priority Data
Oct. 1, 2007 (JP) .................................. 2007-258107

(51) Int. Cl.
*H04W 4/00* (2009.01)
(52) U.S. Cl.
USPC ........................................................ 370/329
(58) Field of Classification Search .................. None
See application file for complete search history.

(56) References Cited

U.S. PATENT DOCUMENTS

| | | | |
|---|---|---|---|
| 2003/0137950 A1* | 7/2003 | Kim et al. ..................... | 370/318 |
| 2004/0114598 A1* | 6/2004 | Veerepalli et al. ............ | 370/394 |
| 2006/0285558 A1 | 12/2006 | Dottling et al. | |
| 2008/0304467 A1* | 12/2008 | Papasakellariou et al. ... | 370/344 |

FOREIGN PATENT DOCUMENTS
CN    1784923 A    6/2006

OTHER PUBLICATIONS

Panasonic, Mapping position of control channel for uplink SC-FDMA, Nov. 2005.*
International Search Report w/translation from PCT/JP2008/067522 dated Dec. 16, 2008 (7 pages).
Written Opinion from PCT/JP2008/067522 dated Dec. 16, 2008 (4 pages).
3GPP TSG RAN WG1 Meeting #49bis, R1-073094; "Control Signaling Location in Presence of Data in E-UTRA UL"; Samsung; Orlando, FL USA; Jun. 25-29, 2007 (4 pages).

(Continued)

*Primary Examiner* — Anh-Vu Ly
(74) *Attorney, Agent, or Firm* — Osha Liang LLP

(57) ABSTRACT

A mobile station includes a channel quality estimation unit configured to estimate downlink channel quality based on a reference signal from a base station and to output the estimated downlink channel quality as channel estimation information; an acknowledgement information determining unit configured to determine whether a downlink data channel from the base station is correctly received and to output the determination result as acknowledgement information; and an acknowledgement information prioritizing unit configured to cause the acknowledgement information to be preferentially transmitted to the base station if transmission timings of the channel estimation information and the acknowledgement information coincide.

8 Claims, 8 Drawing Sheets

OTHER PUBLICATIONS

3GPP TSG RAN WG1 Meeting #49bis, R1-073011; "Multiplexing of Scheduling Request and ACK/NACK and/or CQI"; Nokia Siemens Networks, Nokia; Orlando, USA; Jun. 25-29, 2007 (3 pages).

3GPP TSG RAN WG1 Meeting #50bis, R1-074287; "Multiplexing Scheme for UL Control Signals"; NTT DoCoMo; Shanghai, China; Oct. 8-12, 2007 (3 pages).

3GPP TS 36.211 V1.0.0; "Physical Channels and Modulation"; Mar. 2007 (30 pages).

Office Action for Japanese Patent Application No. 2011-110726 mailed Jul. 17, 2012, with English translation thereof (6 pages).

3GPP TSG RAN WG1 Meeting #50, R1-073461, "CQI + ACK/NACK transmission in PUCCH," NEC Group, Athens, Greece, Aug. 20-24, 2007 (2 pages).

Higuchi et al., "Orthogonal CDMA-Based Multiplexing Method for L1/L2 Control Channels in Evolved UTRA Uplink," NTT DoCoMo, Inc. et al., 2007 (2 pages).

IEICE Technical Report, ISSN 0913-5685, vol. 106 No. 305, RCS2006-133, "Radio Communication Systems," http://www.ieice.org, Oct. 19-20, 2006 (10 pages).

Office Action for Chinese Application No. 200880109087.9 issued Aug. 3, 2012, with English translation thereof (12 pages).

Espacenet, Patent Abstract for Chinese Publication No. 1784923 published Jun. 7, 2006 (1 page).

* cited by examiner

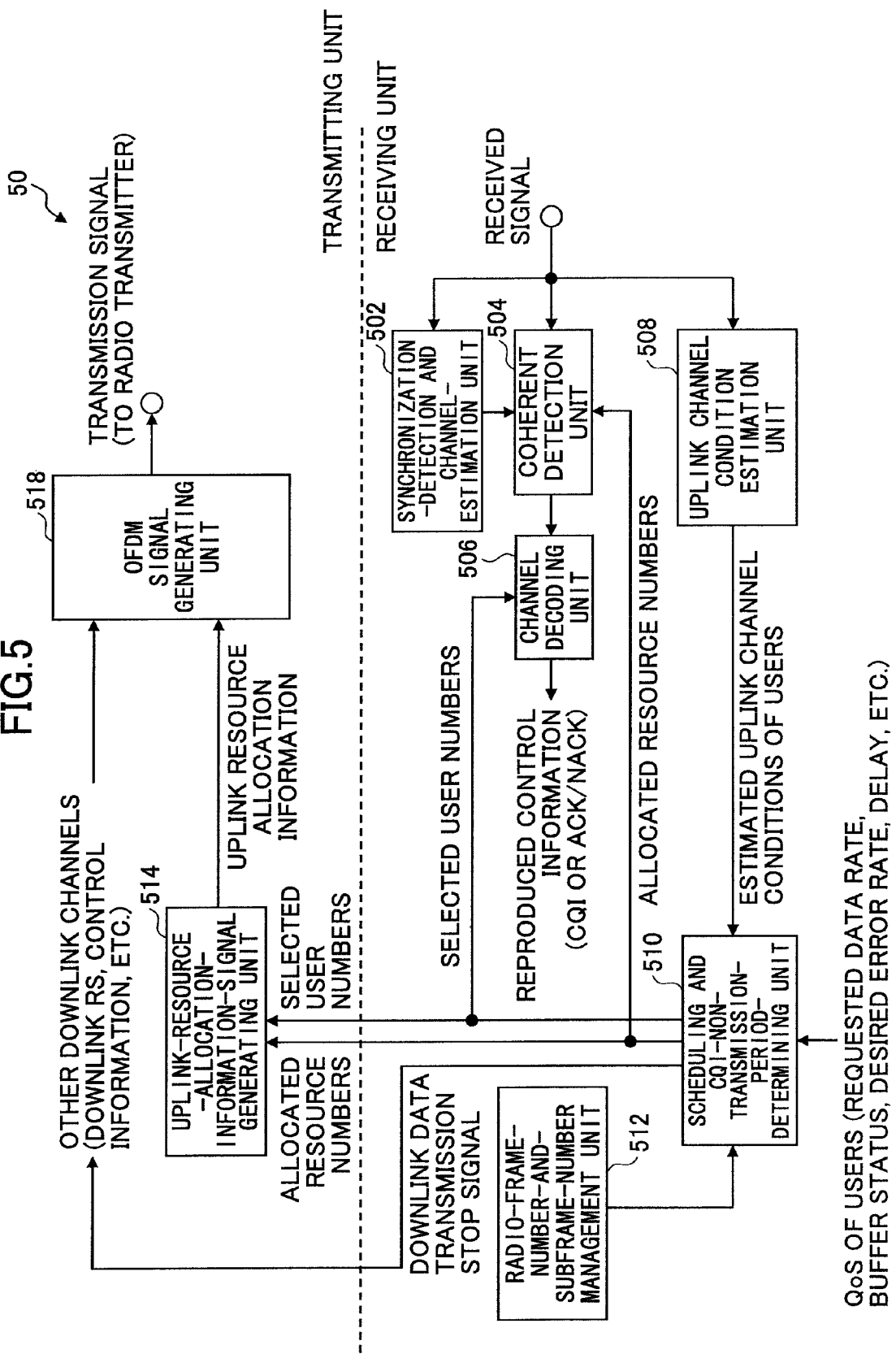

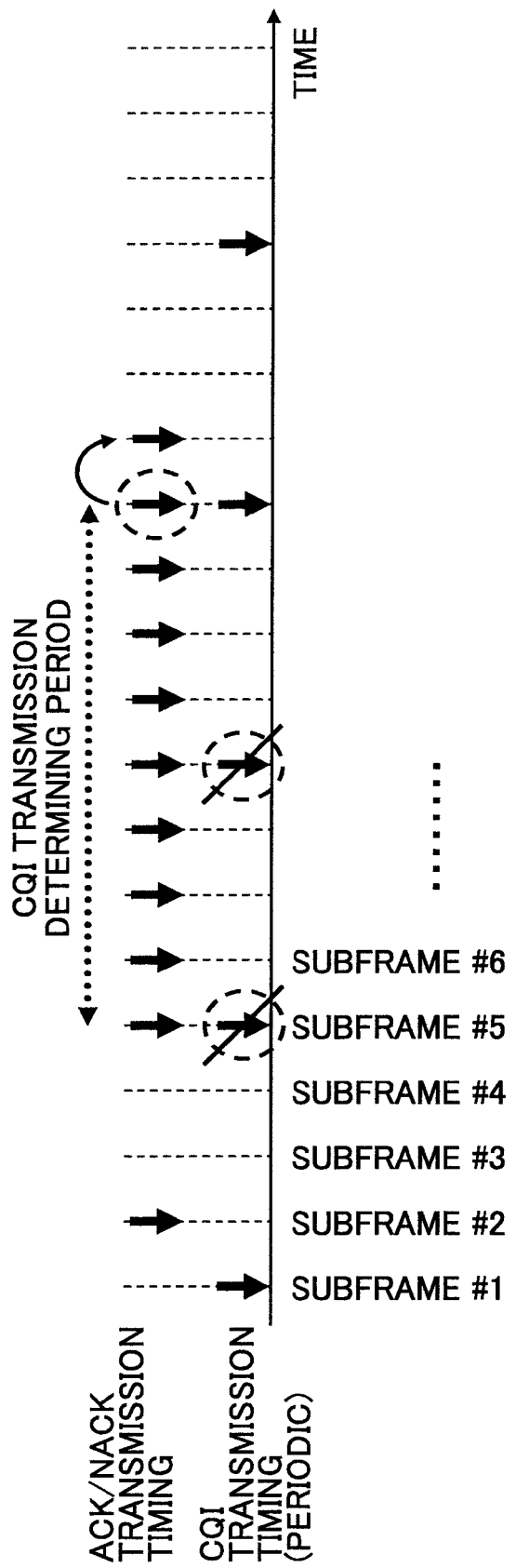

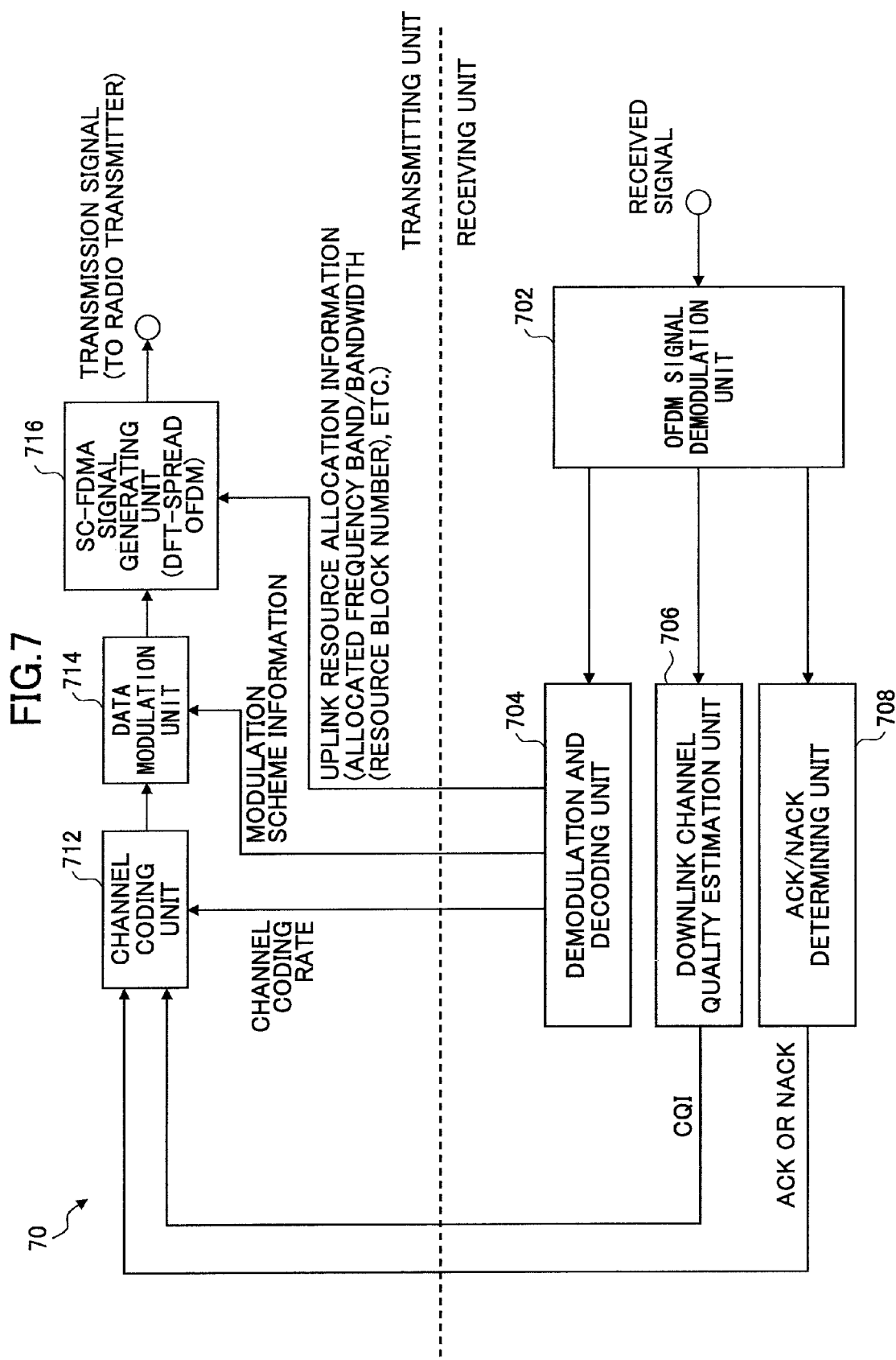

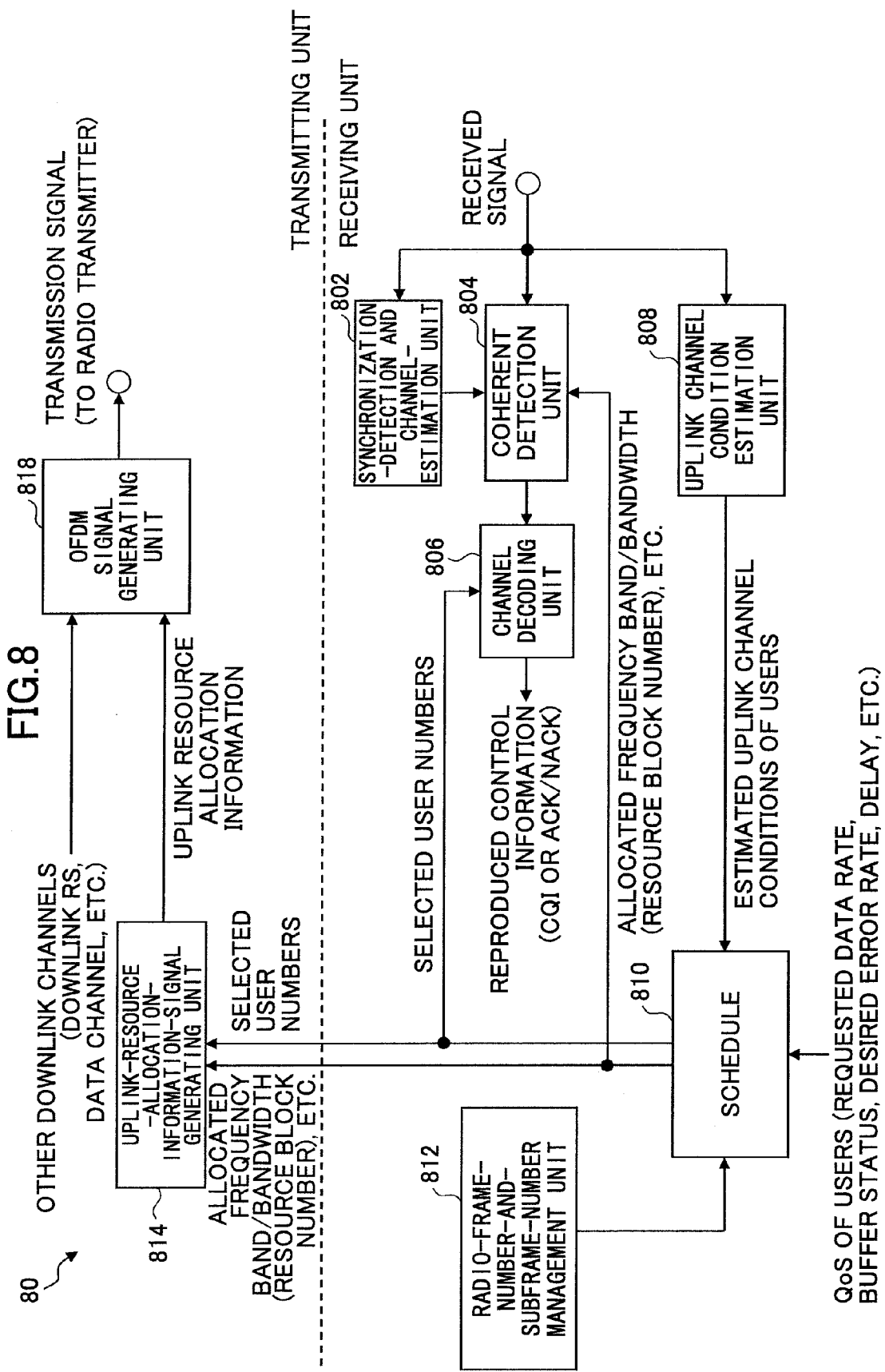

MOBILE STATION, BASE STATION, UPLINK TRANSMISSION METHOD, AND DOWNLINK TRANSMISSION METHOD

TECHNICAL FIELD

The present invention generally relates to a mobile station, a base station, an uplink transmission method, and a downlink transmission method for a communication system employing single-carrier frequency division multiple access as an uplink radio access method.

BACKGROUND ART

In "Evolved Universal Mobile Telecommunications System (UMTS) Terrestrial Radio Access" (E-UTRA), single-carrier frequency division multiple access (SC-FDMA) is employed as an uplink radio access method. See, 3GPP TS 36.211, "E-UTRA; Physical Channels and Modulation (Release 8)" for the uplink radio access method.

In SC-FDMA, as exemplified in FIG. 1, mobile stations (or terminals, user devices, users, etc.; in this example, users A, B, C, D, and E) in a cell transmit signals using different time and frequency resources (the minimum unit of resources is called a resource block) to achieve orthogonality between the signals from the mobile stations. Also in SC-FDMA, a consecutive frequency band is allocated to each mobile station to achieve single-carrier transmission with a low peak-to-average power ratio (PAPR). This in turn makes it possible to reduce power consumption of the mobile stations and to provide wider coverage than multicarrier transmission. Allocation of time and frequency resources is determined by a scheduler of the base station based on propagation conditions of users and QoS (e.g., data rate, error rate, and/or delay) of data to be transmitted. This approach makes it possible to allocate time and frequency resources that provide good propagation conditions to respective users and thereby to increase the throughput.

In SC-FDMA, an uplink control channel is used to transmit a channel quality indicator (CQI) used for frequency scheduling and adaptive modulation and coding of a downlink data channel and to transmit acknowledgement information used for retransmission control of downlink data. The acknowledgement information is generated, for example, based on the result of error detection such as cyclic redundancy check (CRC). When no error is detected, acknowledge (ACK) is transmitted as the acknowledgement information; and when an error is detected, negative acknowledge (NACK) is transmitted as the acknowledgement information.

DISCLOSURE OF INVENTION

Problems to be Solved by the Invention

In uplink single-carrier transmission, there are two methods for multiplexing a control channel and a data channel. Referring to FIG. 2, the first method is used when data are transmitted via uplink. In the first method, a control channel is time-division-multiplexed with a data channel. The second method is used when data are not transmitted via uplink. In the second method, a control channel is transmitted using time and frequency resources dedicated for control information. The time and frequency resources dedicated for control information refer to a narrowband channel that is separated from a data channel in the frequency domain but is provided in the same subframe. The narrowband channel is called a physical uplink control channel (PUCCH). See 3GPP TS 36.211, "E-UTRA; Physical Channels and Modulation (Release 8)" for methods of multiplexing an uplink control channel and a data channel.

When there are no uplink data to be transmitted, an uplink control channel is transmitted using radio resources of PUCCH. When transmitting an uplink control channel via PUCCH, transport formats are necessary for a case where a CQI and acknowledgement information (ACK/NACK information) are multiplexed and transmitted simultaneously, a case where only a CQI is transmitted, and a case where only ACK/NACK information is transmitted. Also, there is a case where scheduling request information and/or a precoding matrix indicator (PMI) for downlink MIMO are transmitted in addition to the CQI and/or the ACK/NACK information. For this reason, it is necessary to provide various transport formats. This in turn complicates configurations and operations of mobile stations and base stations.

One object of the present invention is to provide a mobile station, a base station, an uplink transmission method, and a downlink transmission method that make it possible to prevent the increase in the number of transport formats for PUCCH resulting from multiplexing the CQI and the ACK/NACK information.

Means for Solving the Problems

An aspect of the present invention provides a mobile station that includes a channel quality estimation unit configured to estimate downlink channel quality based on a signal from a base station and to output the estimated downlink channel quality as channel estimation information; an acknowledgement information determining unit configured to determine whether a downlink data channel from the base station is correctly received and to output the determination result as acknowledgement information; and an acknowledgement information prioritizing unit configured to cause the acknowledgement information to be preferentially transmitted to the base station if transmission timings of the channel estimation information and the acknowledgement information coincide.

A second aspect of the present invention provides a base station that includes a frame management unit configured to manage frame information indicating a frame where a mobile station transmits, via uplink, acknowledgement information for at least a data channel transmitted via downlink; and an allocation information signal generating unit configured to generate uplink radio resource allocation information based on the frame information.

A third aspect of the present invention provides an uplink transmission method performed by a mobile station. The method includes the steps of estimating downlink channel quality based on a signal from a base station and outputting the estimated downlink channel quality as channel estimation information; determining whether a downlink data channel from the base station is correctly received and outputting the determination result as acknowledgement information; and if transmission timings of the channel estimation information and the acknowledgement information coincide, preferentially transmitting the acknowledgement information to the base station.

A fourth aspect of the present invention provides a downlink transmission method performed by a base station. The method includes the steps of generating frame information indicating frames where a mobile station transmits, via uplink, downlink channel estimation information and acknowledgement information for a data channel transmitted via downlink; and generating uplink radio resource allocation information based on the frame information.

Advantageous Effect of the Invention

An aspect of the present invention provides a mobile station, a base station, an uplink transmission method, and a downlink transmission method that make it possible to prevent the increase in the number of transport formats for PUCCH resulting from multiplexing the CQI and the ACK/NACK information.

BRIEF DESCRIPTION OF THE DRAWINGS

FIG. 5 is a block diagram of a base station according to an embodiment of the present invention;

FIG. 6 is a drawing illustrating transmission timings of CQI and ACK/NACK information;

FIG. 7 is a block diagram of a mobile station according to another embodiment of the present invention; and FIG. 8 is a block diagram of a base station according to another embodiment of the present invention.

EXPLANATION OF REFERENCES

Figure 1:
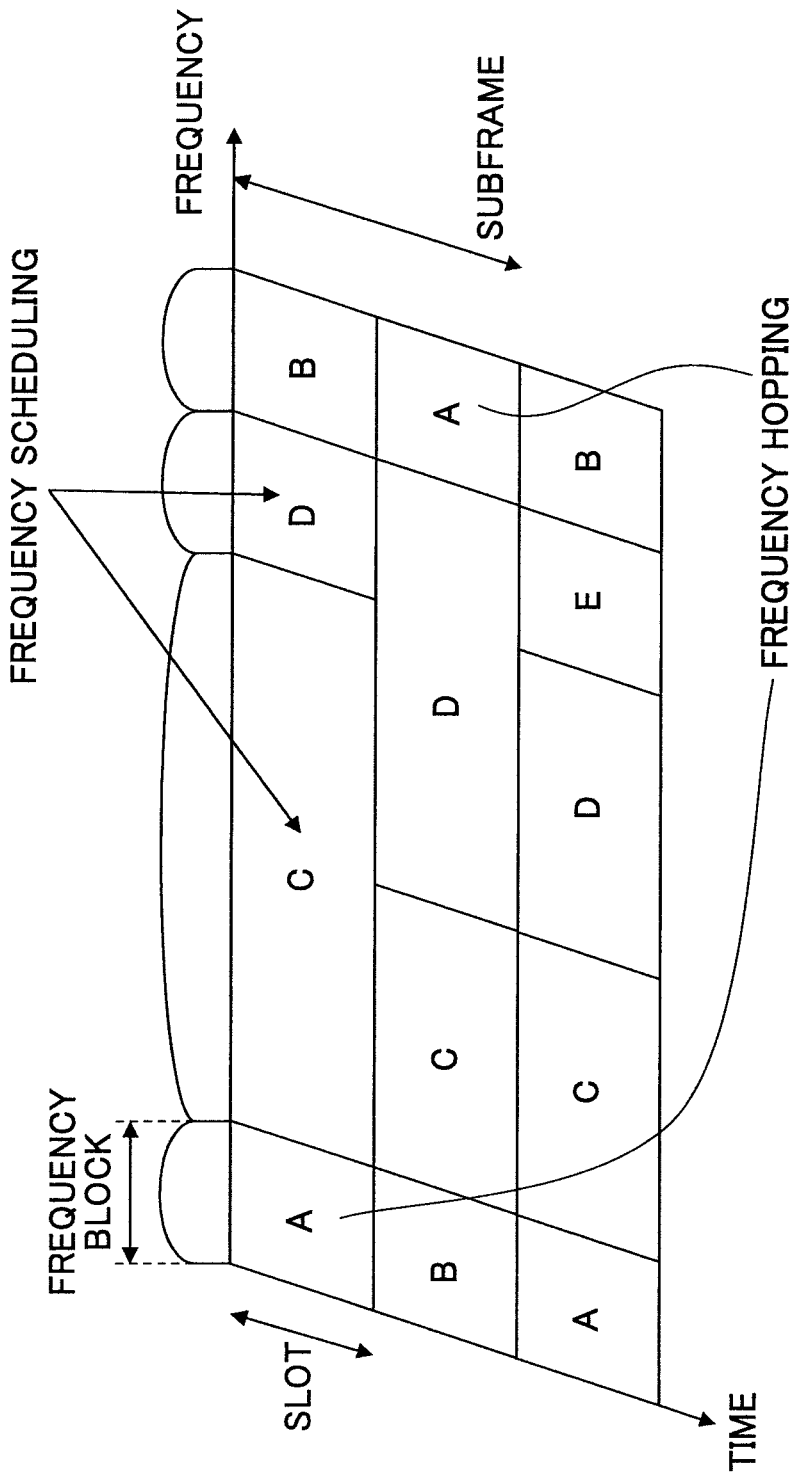
FIG. 1 is a drawing used to describe allocation of radio resources in a single-carrier transmission scheme.
Figure 2:
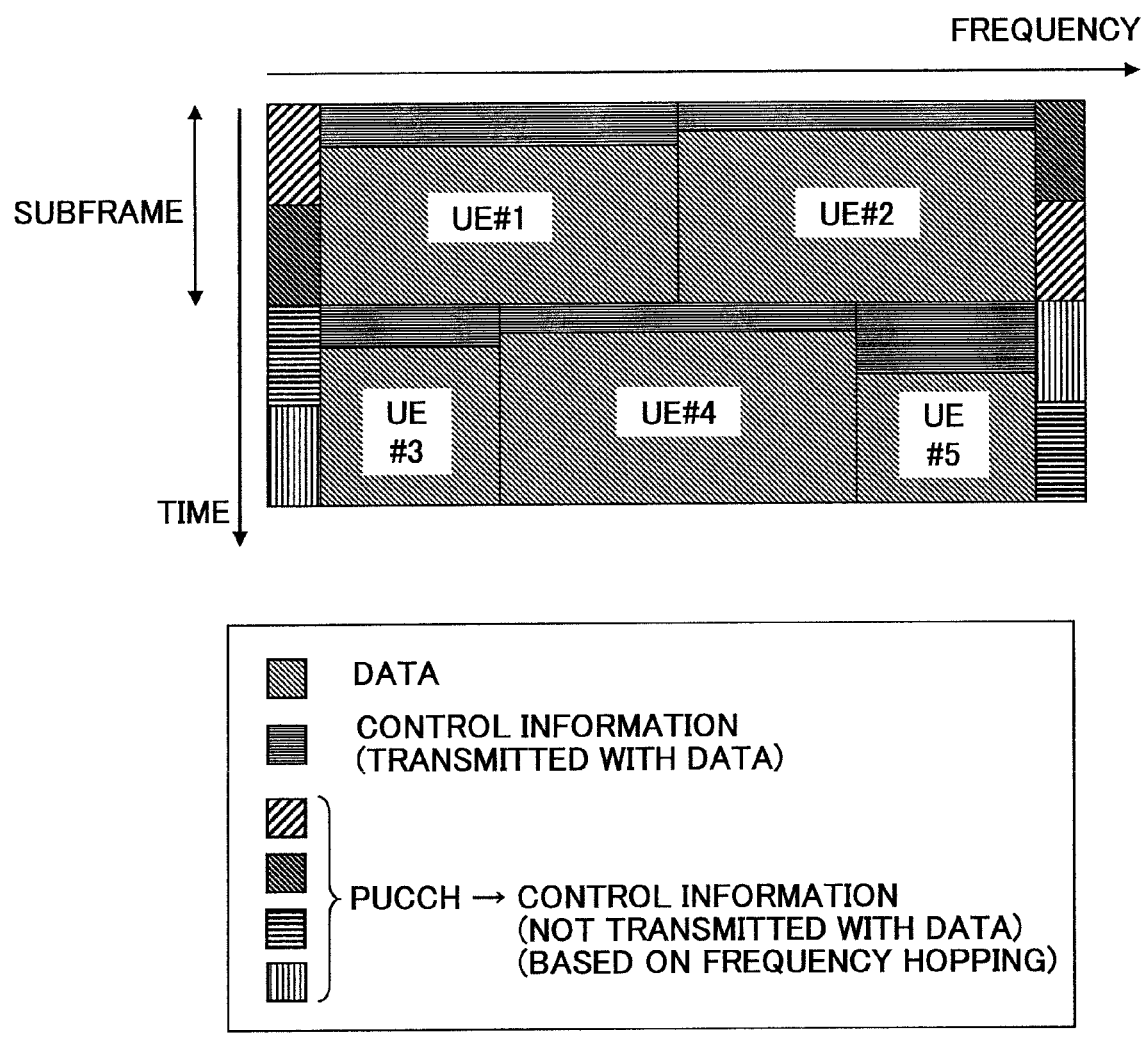
FIG. 2 is a drawing used to describe allocation of uplink radio resources.

30 Mobile station
302 OFDM signal demodulation unit, 304 demodulation and decoding unit, 306 downlink channel quality estimation unit, 308 ACK/NACK determining unit, 310 buffer, 312 channel coding unit, 314 data modulation unit, 316 SC-FDMA signal generating unit
50 base station
502 synchronization-detection and channel-estimation unit, 504 coherent detection unit, 506 channel decoding unit, 508 uplink channel condition estimation unit, 510 scheduling and CQI-non-transmission-period-determining unit, 512 radio-frame-number-and-subframe-number management unit, 514 uplink-resource-allocation-information-signal generating unit, 518 OFDM signal generating unit
70 Mobile station
702 OFDM signal demodulation unit, 704 demodulation and decoding unit, 706 downlink channel quality estimation unit, 708 ACK/NACK determining unit, 714 channel coding unit, 716 data modulation unit, 716 SC-FDMA signal generating unit
80 Base station
802 synchronization-detection and channel-estimation unit, 804 coherent detection unit, 806 channel decoding unit, 808 uplink channel condition estimation unit, 810 scheduler, 812 radio-frame-number-and-subframe-number management unit, 814 uplink-resource-allocation-information-signal generating unit, 818 OFDM signal generating unit

BEST MODE FOR CARRYING OUT THE INVENTION

Embodiments of the present invention are described below with reference to the accompanying drawings.

First Embodiment

Mobile Station

Figure 3:
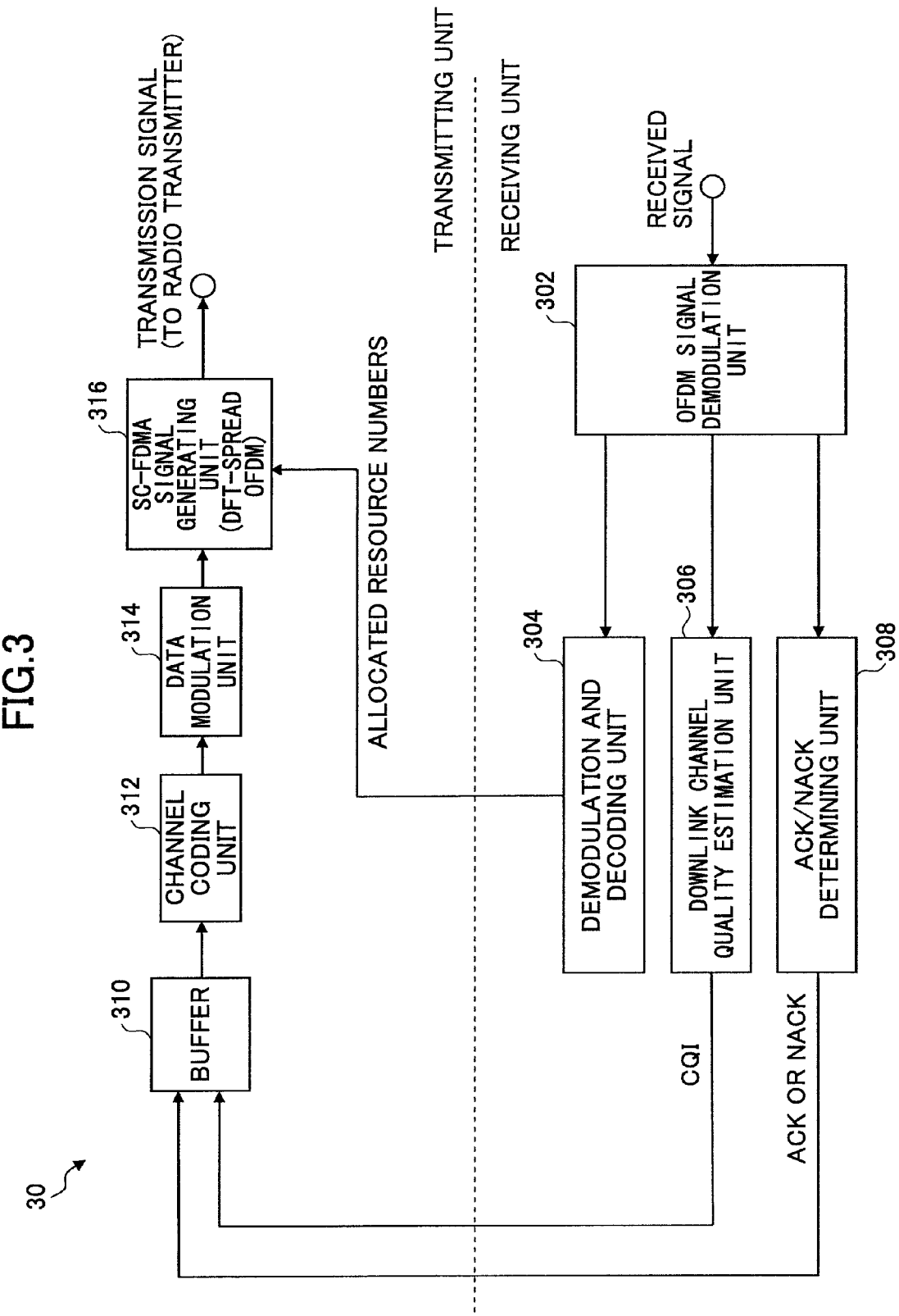
FIG. 3 is a block diagram of a mobile station according to an embodiment of the present invention.

A mobile station 30 according to a first embodiment of the present invention is described below with reference to FIG. 3. As shown in FIG. 3, the mobile station 30 of the first embodiment includes a receiving unit and a transmitting unit. The receiving unit includes an OFDM (orthogonal frequency division multiplexing) signal demodulation unit 302, a demodulation and decoding unit 304 for demodulating and decoding uplink resource allocation information, a downlink channel quality estimation unit 306, and an ACK/NACK determining unit 308 for determining ACK/NACK information for downlink data channels. The transmitting unit includes a buffer 310, a channel coding unit 312, a data modulation unit 314, and an SC-FDMA signal generating unit 316.

The OFDM signal demodulation unit 302 receives an OFDM-modulated signal from a base station (not shown) via an antenna, a duplexer, and a power amplifier (not shown) and OFDM-demodulates the received signal. The OFDM demodulation process performed by the OFDM signal demodulation unit 302 includes signal processing such as orthogonal detection, analog-to-digital (A/D) conversion, and fast Fourier transformation. The OFDM signal demodulation unit 302 outputs the demodulated signal to the demodulation and decoding unit 304, the downlink channel quality estimation unit 306, and the ACK/NACK determining unit 308.

The demodulation and decoding unit 304 receives the demodulated signal from the OFDM signal demodulation unit 302 and extracts, from the received signal, a signal including uplink resource allocation information to be used by the mobile station 30 when transmitting an uplink signal to the base station. The demodulation and decoding unit 304 demodulates and decodes the extracted signal and thereby obtains the uplink resource allocation information. Then, the demodulation and decoding unit 304 outputs the obtained uplink resource allocation information to the SC-FDMA signal generating unit 316.

The downlink channel quality estimation unit 306 receives the demodulated signal from the OFDM signal demodulation unit 302 and measures downlink channel conditions based on a pilot channel (may also be called a reference signal) in the received signal. The downlink channel quality estimation unit 306 outputs the measured downlink channel conditions as a channel quality indicator (CQI) to the buffer 310. A CQI is represented by a value obtained by converting a measurement of reception quality, such as a signal-to-interference ratio (SIR) or a signal-to-interference-noise ratio (SINR), of the pilot channel by using a predetermined method.

The ACK/NACK determining unit 308 receives the demodulated signal from the OFDM signal demodulation unit 302 and determines whether there is an error in a packet (downlink data channel) in the received signal by using an error detection technique such as CRC. The ACK/NACK determining unit 308 outputs acknowledge (ACK) if no error is detected or negative acknowledge (NACK) if an error is detected to the buffer 310.

The buffer 310 receives the CQI from the downlink channel quality estimation unit 306 and receives the ACK/NACK information for the downlink data channel from the ACK/NACK determining unit 308. The mobile station 30 transmits the CQI to the base station at regular intervals determined in advance between the mobile station 30 and the base station. Therefore, the buffer 310 receives the CQI at predetermined intervals from the channel quality estimation unit 306. Meanwhile, the buffer 310 receives the ACK/NACK information irregularly. This is because the ACK/NACK determining unit 308 determines the presence of an error and outputs ACK/NACK information only when a data channel is included in a signal transmitted from the base station (i.e., only when data are transmitted). Therefore, the buffer 310, at a given timing, receives only the CQI, only the ACK/NACK information, or both of the CQI and the ACK/NACK information.

The buffer 310 determines whether only the CQI, only the ACK/NACK information, or both of the CQI and the ACK/NACK information are received. When only the CQI is received, the buffer 310 outputs the CQI to the channel coding unit 312 When only the ACK/NACK information is received, the buffer 310 outputs the ACK/NACK information to the channel coding unit 312 When both of the CQI and the ACK/NACK information are received, the buffer 310 discards the CQI and outputs the ACK/NACK information to the channel coding unit 312 according to a rule determined between the mobile station 30 and the base station. For example, the buffer 310 may include an acknowledgement information prioritizing unit that preferentially outputs the ACK/NACK information when both of the CQI and the ACK/NACK information are received.

The channel coding unit 312 receives either the CQI or the ACK/NACK information from the buffer 310 and performs channel coding on the received information to generate a signal. The channel coding unit 312 outputs the generated signal to the data modulation unit 314.

The data modulation unit 314 performs predetermined modulation processing on the signal received from the channel coding unit 312 and thereby generates, for each block, a sequence including information (CQI or ACK/NACK information) to be returned to the base station. The data modulation unit 314 outputs the generated sequence to the SC-FDMA signal generating unit 316.

The SC-FDMA signal generating unit 316 performs processing such as discrete Fourier transformation (DFT), subcarrier mapping in the frequency domain based on the uplink resource allocation information received from the demodulation and decoding unit 304, inverse fast Fourier transformation (IFFT), and addition of cyclic prefixes on the sequence received from the data modulation unit 314, and thereby generates an SC-FDMA signal to be transmitted via uplink. The generated SC-FDMA signal is transmitted via the power amplifier, the duplexer, and the antenna to the base station.

Figure 4A:
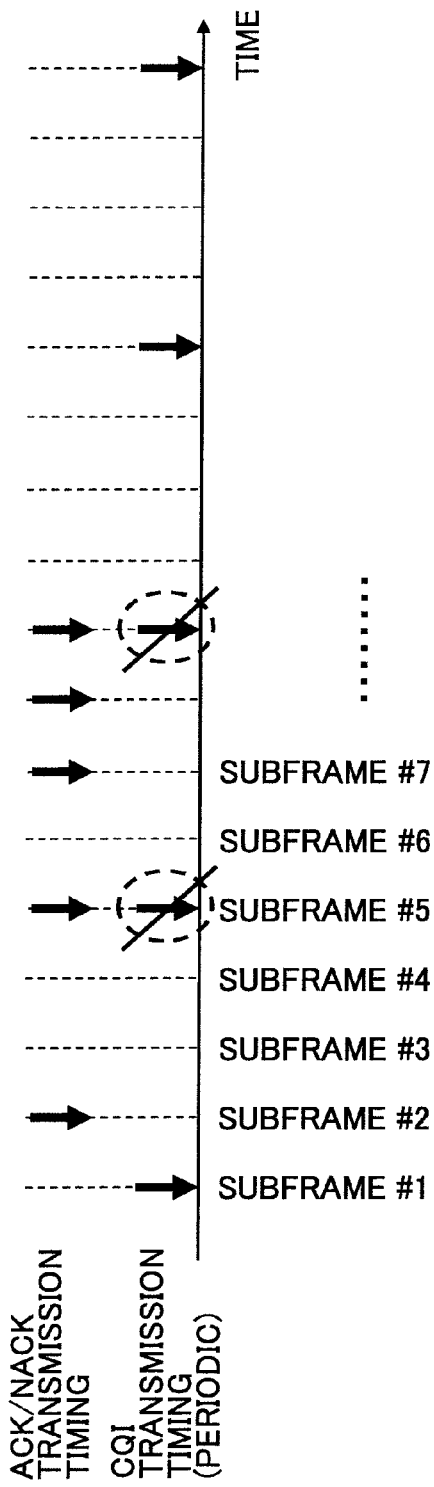
FIGS. 4A and 4B are drawings illustrating transmission timings of CQI and ACK/NACK information.

Operations of the mobile station 30 of this embodiment are described below with reference to FIG. 4A. FIG. 4A is a drawing illustrating transmission timings of the CQI and the ACK/NACK information. In FIG. 4A, the horizontal axis indicates time. Also in FIG. 4A, dotted lines indicate subframes used for transmissions from the mobile station 30, arrows in the upper row indicate timings at which the ACK/NACK information is transmitted, and arrows in the lower row indicate timings at which the CQI is transmitted. In this example, the CQI is transmitted in subframe #1 and the ACK/NACK information is transmitted in subframe #2.

As described above, the CQI is transmitted from the mobile station 30 to the base station at predetermined intervals. In the example shown in FIG. 4A, the CQI is transmitted once in four subframes, i.e., in subframe #1, subframe #5, and so on. Meanwhile, the ACK/NACK information is transmitted irregularly, i.e., when the mobile station 30 receives a data channel from the base station. In the example shown in FIG. 4A, the ACK/NACK information is transmitted in subframe #1, subframe #5, subframe #7, and so on. According to the predetermined intervals, the CQI is to be transmitted in subframe #5, and therefore both of the CQI and the ACK/NACK information are to be transmitted in subframe #5. However, when both of the CQI and the ACK/NACK information are received, the buffer 310 of the mobile station 30 of this embodiment discards the CQI and outputs only the ACK/NACK information. Therefore, in subframe #5, the CQI is not transmitted and only the ACK/NACK information is transmitted. This cancellation of transmission of the CQI is indicated by an oval-shaped dotted line and a diagonal line. The oval-shaped line and the diagonal line are also shown at another subframe (subframe #9) and indicate simultaneous transmission of the CQI and the ACK/NACK information is also prevented in subframe #9.

One subframe includes two slots on the time axis and typically has a length of 1 ms.

As described above, in the mobile station 30 of the first embodiment, the buffer 310 receives a CQI from the channel quality estimation unit 306 and ACK/NACK information from the ACK/NACK determining unit 308, determines whether both of the CQI and the ACK/NACK information are received at the same time, and if both of them are received at the same time, outputs only the ACK/NACK information to the channel coding unit 312. With this configuration, the CQI and the ACK/NACK information are not multiplexed. This in turn eliminates the need to provide transport formats for multiplexing the CQI and the ACK/NACK information and thereby makes it possible to reduce the number of transport formats. Also with this configuration, since the ACK/NACK information is returned every time when a data channel is transmitted from the base station, communications between the mobile station 30 and the base station are maintained properly.

As an alternative, when the CQI and the ACK/NACK information are received at the same time, the buffer 310 may be configured to temporarily store the CQI instead of discarding it. In this case, for example, the buffer 310 preferentially outputs the ACK/NACK information, determines whether it is possible to transmit the CQI in the next subframe following the subframe where the ACK/NACK information is transmitted, and if it is possible, outputs the temporarily stored CQI to the channel coding unit 312 so that the CQI is transmitted in the next frame. With this configuration, as exemplified in FIG. 4B, the ACK/NACK information is transmitted in subframe #5 (where, according to the predetermined intervals, the CQI and the ACK/NACK information would have been (multiplexed and) transmitted at the same time) and the CQI is transmitted in the next subframe #6. Thus, this configuration enables the base station to perform scheduling based on the CQI transmitted from the mobile station 30.

Also, instead of in the next subframe following the subframe where the ACK/NACK information is transmitted, the temporarily stored CQI may be transmitted in any one of subsequent subframes following the subframe where the ACK/NACK information is transmitted.

Meanwhile, if the CQI and the ACK/NACK information are multiplexed and transmitted simultaneously as an information signal from the mobile station, the coverage of the information signal tends to become smaller compared with a case where only the CQI or the ACK/NACK information is transmitted. This in turn may reduce the communication quality of a user (mobile station) near the cell edge and may cause the user to become unable to communicate. To prevent such problems, it is necessary to increase the transmission power. However, increasing the transmission power increases the power consumption of the mobile station. With the mobile station 30 of this embodiment, since the CQI and the ACK/NACK information are not multiplexed, the above problems can be prevented.

(Base Station)

A base station 50 according to the first embodiment of the present invention is described below with reference to FIG. 5. The base station 50 provides communication services to the mobile station 30 (shown in FIG. 3). As shown in FIG. 5, the base station 50 includes a receiving unit and a transmitting unit. The receiving unit includes a synchronization-detection and channel-estimation unit 502, a coherent detection unit 504, a channel decoding unit 506, an uplink channel condition estimation unit 508 for estimating uplink channel conditions of users, a scheduling and CQI-non-transmission-period-determining unit 510, and a radio-frame-number-and-subframe-number management unit 512. The transmitting unit includes an uplink-resource-allocation-information-signal generating unit 514 and an OFDM signal generating unit 518.

The synchronization-detection and channel-estimation unit 502 receives a signal (SC-FDMA signal) from a mobile station via an antenna, a duplexer, and a power amplifier (not shown). The synchronization-detection and channel-estimation unit 502 determines a reception timing based on an uplink pilot channel (or a synchronization channel) in the received signal, estimates uplink channel conditions based on the reception conditions of the uplink pilot channel, and generates information for channel compensation. Then, the synchronization-detection and channel-estimation unit 502 outputs the generated information to the coherent detection unit 504.

The coherent detection unit 504 receives the signal from the mobile station via the antenna, the duplexer, and the power amplifier (not shown). The coherent detection unit 504 demodulates the received signal based on the information received from the synchronization-detection and channel-estimation unit 502, and outputs the demodulated signal to the channel decoding unit 506.

The channel decoding unit 506 properly channel-decodes the demodulated signal received from the coherent detection unit 504 and thereby reproduces and outputs a CQI or ACK/NACK information.

The uplink channel condition estimation unit 508 receives the SC-FDMA signal from the mobile station via the antenna, the duplexer, and the power amplifier (not shown), and estimates uplink channel conditions (or uplink channel quality) based on a pilot channel (or a reference signal) in the received signal. The uplink channel condition estimation unit 508 outputs the estimated uplink channel conditions (as channel estimation information) to the scheduling and CQI-non-transmission-period-determining unit 510.

Figure 4B:
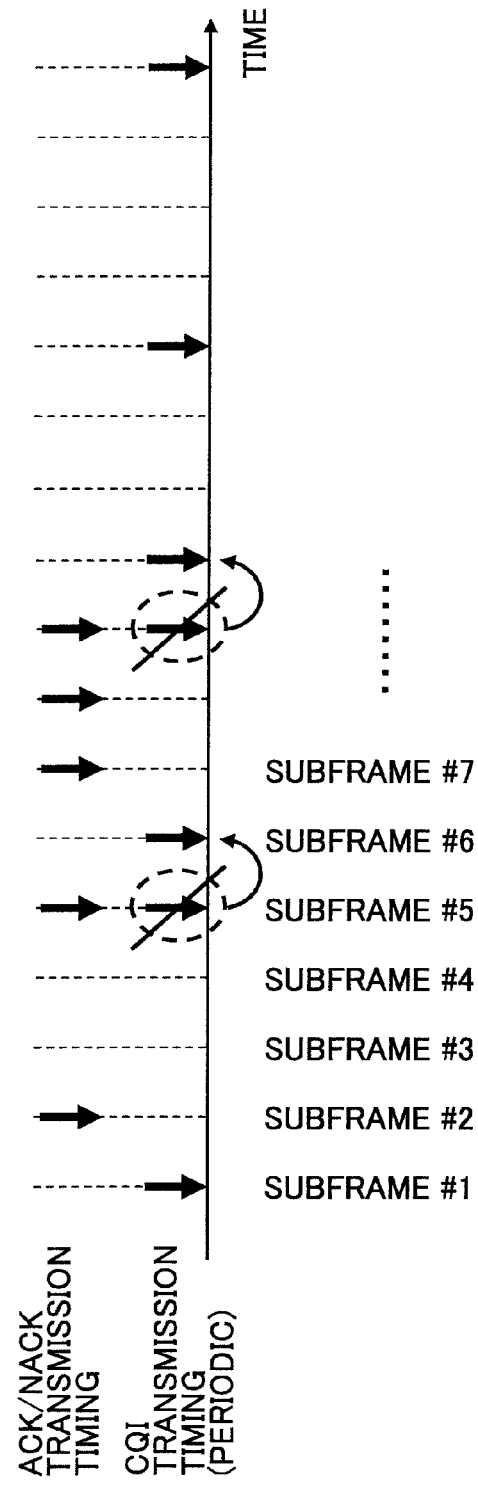

The scheduling and CQI-non-transmission-period-determining unit 510 performs downlink scheduling based on quality of service (QoS) of each user, such as a requested data rate, a buffer status, a desired error rate, and a delay, and on the estimated uplink channel conditions received from the uplink channel condition estimation unit 508. Also, the scheduling and CQI-non-transmission-period-determining unit 510 selects destination mobile stations (more particularly, user numbers) based on the estimated uplink channel conditions, and determines allocation of uplink resources to be used for communications by the selected mobile stations (hereafter, for descriptive purposes, the selected mobile stations may be represented by the mobile station 30). Also, the scheduling and CQI-non-transmission-period-determining unit 510 receives, from the radio-frame-number-and-subframe-number management unit 512, a frame number of a frame to be used by the mobile station 30 to transmit ACK/NACK information to the base station 50. The radio-frame-number-and-subframe-number management unit 512 manages frame numbers (e.g., subframe numbers as shown in FIGS. 4A and 4B) to be used by mobile stations to transmit ACK/NACK information.

Also, the scheduling and CQI-non-transmission-period-determining unit 510 determines transmission timings (subframes) of the CQI and the ACK/NACK information from the mobile station 30. The scheduling and CQI-non-transmission-period-determining unit 510 can determine transmission timings of the CQI because it is transmitted at predetermined intervals from the mobile station 30 as described above with reference to FIGS. 4A and 4B. Also, the scheduling and CQI-non-transmission-period-determining unit 510 can determine the transmission timing of the ACK/NACK information based on the frame number received from the radio-frame-number-and-subframe-number management unit 512.

Further, the scheduling and CQI-non-transmission-period-determining unit 510 counts the number of timings (frames) or the number of times when transmission timings of the CQI and the ACK/NACK information coincide and the mobile station 30 transmits only the ACK/NACK information. If the number of timings exceeds a predetermined value, the scheduling and CQI-non-transmission-period-determining unit 510 determines the next timing when transmission timings of the CQI and the ACK/NACK information coincide and outputs a downlink data transmission stop signal to a downlink data signal generating unit (not shown) to prevent transmission of ACK/NACK information at the determined timing. Effects of this configuration are described later.

The scheduling and CQI-non-transmission-period-determining unit 510 outputs allocated resource numbers (resource numbers of the allocated resources) to the uplink-resource-allocation-information-signal generating unit 514 and the coherent detection unit 504. The scheduling and CQI-non-transmission-period-determining unit 510 also outputs the selected user numbers to the uplink-resource-allocation-information-signal generating unit 514 and the channel decoding unit 506.

The uplink-resource-allocation-information-signal generating unit 514 associates the allocated resource numbers with the allocated user numbers to generate uplink resource allocation information and outputs the generated uplink resource allocation information to the OFDM signal generating unit 518.

When receiving the downlink data transmission stop signal from the scheduling and CQI-non-transmission-period-determining unit 510, the downlink data signal generating unit (not shown) stops and postpones the transmission of data specified by the downlink data transmission stop signal.

The OFDM signal generating unit 518 receives the uplink resource allocation information from the uplink-resource-allocation-information-signal generating unit 514 and also receives other downlink channels (such as a downlink data signal, a reference signal (common pilot signal), and control information (control channel)) to which resources are allocated taking into account downlink channel conditions and QoS of users. Based on scheduling information, the OFDM signal generating unit 518 generates an OFDM signal including a downlink data signal, the uplink resource allocation information, and the other downlink channels. The OFDM signal generating process performed by the OFDM signal generating unit 518 includes signal processing such as mapping, inverse fast Fourier transformation (IFFT), digital-to-analog (D/A) conversion, and orthogonal modulation. The OFDM signal generated by the OFDM signal generating unit 518 is transmitted via the power amplifier, the duplexer, and the antenna (not shown) to the mobile stations.

Next, advantageous effects of the base station 50 of the first embodiment are described.

As described above, the mobile station 30 (FIG. 3) preferentially transmits the ACK/NACK information to prevent simultaneous transmission of the CQI and the ACK/NACK information. For this reason, in some cases, the base station 50 does not receive the CQI at predetermined intervals. However, based on the predetermined intervals and the frame numbers being managed by the radio-frame-number-and-subframe-number management unit 512, the base station 50 can determine timings (frames) where the transmission timings of the CQI and the ACK/NACK information coincide. Therefore, even if the CQI is not received at the determined timings, the base station 50 does not misidentify such events as communication problems. Also, even if the CQI is not received at the timings (frames) where the transmission timings of the CQI and the ACK/NACK information coincide, the base station 50 can perform scheduling based on previously received CQIs and properly maintain communications with the mobile station 30.

Thus, the base station 50 of this embodiment allows the mobile station 30 to function as described above, and thereby makes it possible to reduce the number of transport formats and to increase the coverage.

As described above with reference to FIG. 4B, the buffer 310 of the mobile station 30 may be configured to temporarily store the CQI and to transmit the CQI in the next (or any subsequent) subframe (timing) following a subframe (timing) when the ACK/NACK information is transmitted. This configuration allows the base station 50 to more frequently receive updated CQIs and is therefore preferable in terms of smooth communications with the mobile station 30.

Also, the scheduling and CQI-non-transmission-period-determining unit 510 of the base station 50 may be configured to count the number of times when the mobile station 30 transmits only the ACK/NACK information because transmission timings of the CQI and the ACK/NACK information coincide. The scheduling and CQI-non-transmission-period-determining unit 510 determines the next timing when transmission timings of the CQI and the ACK/NACK information coincide after the number of times exceeds a predetermined value, and outputs a downlink data transmission stop signal to the downlink data signal generating unit (not shown) to prevent transmission of downlink data. When receiving the downlink data transmission stop signal, the downlink data signal generating unit stops (or postpones) the transmission of the downlink data. Since the data are not transmitted, the mobile station 30 does not transmit ACK/NACK information. In other words, in a given frame where the transmission timings of the CQI and the ACK/NACK information coincide, the mobile station 30 transmits only the CQI and does not transmit the ACK/NACK information. As a result, the base station 50 can receive the CQI in the frame. This configuration provides advantageous effects as described below.

The mobile station 30 of this embodiment preferentially transmits the ACK/NACK information over the CQI to prevent simultaneous transmission of the CQI and the ACK/NACK information. Therefore, in some cases, a base station may not be able to receive the CQI for a long period of time. To prevent this problem, the base station 50 of this embodiment is configured to stop transmission of data if the number of times when the mobile station 30 refrains from transmitting the CQI exceeds a predetermined value and thereby to allow the mobile station 30 to transmit the CQI.

Thus, the base station 50 of this embodiment also makes it possible to receive an updated CQI within a predetermined period of time and thereby to properly perform scheduling.

The base station 50 is preferably configured to signal (or report) to the mobile station 30 that the transmission of data is stopped (or postponed).

Instead of counting the number of times when the CQI is not transmitted from the mobile station 30, the base station 50 may be configured to define a CQI transmission determining period as shown in FIG. 6 and to determine whether the CQI is transmitted again within the CQI transmission determining period after the last transmission of CQI from the mobile station 30. If the CQI is not transmitted within the CQI transmission determining period, the base station 50 stops (or postpones) transmission of data so that the CQI is transmitted from the mobile station 30.

Second Embodiment

Mobile Station

A mobile station 70 according to a second embodiment of the present invention is described below with reference to FIG. 7. As shown in FIG. 7, the mobile station 70 of the second embodiment includes a receiving unit and a transmitting unit. The receiving unit includes an OFDM signal demodulation unit 702, a demodulation and decoding unit 704 for demodulating and decoding uplink resource allocation information, a downlink channel quality estimation unit 706, and an ACK/NACK determining unit 708 for downlink data channels. The transmitting unit includes a channel coding unit 712, a data modulation unit 714, and an SC-FDMA signal generating unit 716.

The OFDM signal demodulation unit 702 receives an OFDM-modulated signal from a base station (not shown) via an antenna, a duplexer, and a power amplifier (not shown), and OFDM-demodulates the received signal. The OFDM demodulation process performed by the OFDM signal demodulation unit 702 includes signal processing such as orthogonal detection, analog-to-digital (A/D) conversion, and fast Fourier transformation. The OFDM signal demodulation unit 702 outputs the demodulated signal to the demodulation and decoding unit 704, the downlink channel quality estimation unit 706, and the ACK/NACK determining unit 708.

The demodulation and decoding unit 704 receives the demodulated signal from the OFDM signal demodulation unit 702 and extracts, from the received signal, a signal including uplink resource allocation information to be used by the mobile station 70 when transmitting an uplink signal to the base station. The demodulation and decoding unit 704 demodulates and decodes the extracted signal and thereby obtains the uplink resource allocation information. In this embodiment, as described later, the base station allocates resources to the mobile station 70 such that the mobile station 70 can transmit the CQI and the ACK/NACK information by using resources (physical uplink shared channel (PUSCH)) used for data transmission. More particularly, the base station reports an allocated frequency band (or bandwidth) and a subframe number via the uplink resource information. Alternatively, this uplink scheduling information may be reported from the base station to the mobile station 70 via a separate signal.

The demodulation and decoding unit 704 also extracts, from the received signal, a signal including information regarding a modulation scheme specified by the base station and thereby obtains modulation scheme information. Further, the demodulation and decoding unit 704 extracts, from the received signal, a signal including information regarding a modulation rate (channel coding rate) specified by the base station and thereby obtains modulation rate (channel coding rate) information.

The demodulation and decoding unit 704 outputs the obtained uplink resource allocation information to the SC-FDMA signal generating unit 716, outputs the modulation scheme information to the data modulation unit 714, and outputs the channel coding rate to the channel coding unit 712.

The downlink channel quality estimation unit 706 receives the demodulated signal from the OFDM signal demodulation unit 702 and measures downlink channel conditions (or downlink channel quality) based on a pilot channel (or a reference signal) in the received signal. The downlink channel quality estimation unit 706 outputs the measured downlink channel conditions as a CQI to the channel coding unit 712.

The ACK/NACK determining unit 708 receives the demodulated signal from the OFDM signal demodulation unit 702 and determines whether there is an error in a packet (downlink data channel) in the received signal. The ACK/NACK determining unit 708 outputs acknowledge (ACK) if no error is detected or negative acknowledge (NACK) if an error is detected to the channel coding unit 712.

The channel coding unit 712 receives the CQI from the downlink channel quality estimation unit 706 and receives the ACK/NACK information for the downlink data channel from the ACK/NACK determining unit 708. The channel coding unit 712 performs channel coding on the received CQI and the ACK/NACK information based on the channel coding rate information received from the demodulation and decoding unit 704 and thereby generates a signal. The channel coding unit 712 outputs the generated signal to the data modulation unit 714.

The data modulation unit 714 modulates the signal received from the channel coding unit 712 based on the modulation scheme information received from the demodulation and decoding unit 704, and thereby generates, for each block, an information sequence to be transmitted to the base station. The data modulation unit 714 outputs the generated sequence to the SC-FDMA signal generating unit 716.

The SC-FDMA signal generating unit 716 performs processing such as discrete Fourier transformation (DFT), subcarrier mapping in the frequency domain based on the uplink resource allocation information received from the demodulation and decoding unit 704, inverse fast Fourier transformation (IFFT), and addition of cyclic prefixes on the sequence received from the data modulation unit 714, and thereby generates an SC-FDMA signal to be transmitted via uplink. The generated SC-FDMA signal is transmitted via the power amplifier, the duplexer, and the antenna to the base station.

Thus, based on the uplink resource allocation information reported from the base station, the mobile station 70 of the second embodiment allocates the PUSCH specified by the base station to the CQI and the ACK/NACK information such that they are multiplexed. In other words, the CQI and the ACK/NACK information are transmitted at the same time to the base station via the PUSCH.

(Base Station)

A base station 80 according to the second embodiment of the present invention is described below with reference to FIG. 8. The base station 80 provides communication services to the mobile station 70 (shown in FIG. 7). As shown in FIG. 8, the base station 80 includes a receiving unit and a transmitting unit. The receiving unit includes a synchronization-detection and channel-estimation unit 802, a coherent detection unit 804, a channel decoding unit 806, an uplink channel condition estimation unit 808 for estimating uplink channel conditions of users, a scheduler 810, and a radio-frame-number-and-subframe-number management unit 812. The transmitting unit includes an uplink-resource-allocation-information-signal generating unit 814 and an OFDM signal generating unit 818.

The synchronization-detection and channel-estimation unit 802 has substantially the same functions and configurations as those of the synchronization-detection and channel-estimation unit 502 of the base station 50 (FIG. 5) of the first embodiment. The coherent detection unit 804 has substantially the same functions and configurations as those of the coherent detection unit 504 of the base station 50 (FIG. 5) of the first embodiment. Also, the channel decoding unit 806 has substantially the same functions and configurations as those of the channel decoding unit 506 of the base station 50 (FIG. 5) of the first embodiment. Therefore, descriptions of those units are omitted here.

The uplink channel condition estimation unit 808 receives an SC-FDMA signal from the mobile station via an antenna, a duplexer, and a power amplifier (not shown), and estimates uplink channel conditions (or uplink channel quality) based on a pilot channel (or a reference signal) in the received signal. The uplink channel condition estimation unit 808 outputs the estimated uplink channel conditions to the scheduler 810.

The scheduler 810 performs downlink scheduling based on quality of service (QoS) of each user, such as a requested data rate, a buffer status, a desired error rate, and a delay, and on the estimated uplink channel conditions received from the uplink channel condition estimation unit 808. Also, the scheduler 810 selects destination mobile stations (more particularly, user numbers) and determines allocation of uplink resources to be used for communications by the selected mobile stations (hereafter, for descriptive purposes, the selected mobile stations may be represented by the mobile station 70). Further, the scheduler 810 receives, from the radio-frame-number-and-subframe-number management unit 812, a frame number of a frame to be used by the mobile station 70 to transmit ACK/NACK information to the base station 80. The radio-frame-number-and-subframe-number management unit 812 manages frame numbers (e.g., subframe numbers as shown in FIGS. 4A and 4B) used by mobile stations to transmit ACK/NACK information.

Also, the scheduler 810 determines transmission timings (subframes) of the CQI and the ACK/NACK information from the mobile station 70. The scheduler 810 can determine the transmission timing of the CQI because it is transmitted at predetermined intervals from the mobile station 70 as described in the first embodiment with reference to FIGS. 4A and 4B. Also, the scheduler 810 can determine the transmission timing of the ACK/NACK information based on the frame number received from the radio-frame-number-and-subframe-number management unit 812.

Based on the determined transmission timings, the scheduler 810 determines allocation of uplink resources. For example, when the mobile station 70 is to transmit only the CQI, the scheduler 810 determines allocation of uplink resources such that the PUCCH is allocated to the CQI. Meanwhile, when the mobile station 70 is to transmit only the ACK/NACK information, the scheduler 810 determines allocation of uplink resources such that the PUCCH is allocated to the ACK/NACK information. Meanwhile, when the mobile station 70 is to transmit both the CQI and the ACK/NACK information, the scheduler 810 determines allocation of uplink resources such that the CQI and the ACK/NACK information are multiplexed in the PUSCH that is normally used for data transmission. This uplink scheduling information may be reported via a separate signal.

The scheduler 810 outputs allocated resource numbers (e.g., allocated frequency bands (or bandwidth) and subframe numbers) to the uplink-resource-allocation-information-signal generating unit 814 and the coherent detection unit 804. Also, the scheduler 810 outputs the selected user numbers to the uplink-resource-allocation-information-signal generating unit 814 and the channel decoding unit 806.

The uplink-resource-allocation-information-signal generating unit 814 associates the allocated resource numbers with the allocated user numbers to generate uplink resource allocation information and outputs the generated uplink resource allocation information to the OFDM signal generating unit 818.

The OFDM signal generating unit 818 receives the uplink resource allocation information from the uplink-resource-allocation-information-signal generating unit 814 and also receives other downlink channels (such as a downlink reference signal (common pilot signal) and control information (control channel)) to which resources are allocated taking into account downlink channel conditions and QoS of users. Based on scheduling information, the OFDM signal generating unit 818 generates an OFDM signal including the uplink resource allocation information and the other downlink channels. The OFDM signal generating process performed by the OFDM signal generating unit 818 includes signal processing such as mapping, inverse fast Fourier transformation (IFFT), digital-to-analog (D/A) conversion, and orthogonal modulation. The OFDM signal generated by the OFDM signal generating unit 818 is transmitted via the power amplifier, the duplexer, and the antenna (not shown) to the mobile stations.

Thus, when the mobile station 70 (FIG. 7) is to transmit both the CQI and the ACK/NACK information at the same time to the base station 80, the scheduler 810 of the base station 80 of this embodiment determines allocation of uplink resources such that the PUSCH is allocated to the CQI and the ACK/NACK information, and the allocated uplink resources are reported to the mobile station 70 via uplink resource allocation information. The mobile station 70 returns the CQI and the ACK/NACK information to the base station 80 based on the uplink resource allocation information. Accordingly, the CQI and the ACK/NACK information to be transmitted to the base station 80 are not multiplexed in the PUCCH. This in turn eliminates the need to provide transport formats for multiplexing the CQI and the ACK/NACK information in the PUCCH and thereby makes it possible to reduce the number of transport formats.

Although the present invention is described above based on various embodiments, the present invention is not limited to the above embodiments and variations and modifications may be made without departing from the scope of the present invention.

For example, in the mobile station 30 of the first embodiment, the buffer 310 determines whether the CQI and the ACK/NACK information are to be transmitted at the same timing (subframe). Alternatively, this may be done by a different component of the mobile station 30, or an additional component may be added to the mobile station 30 for this purpose. Also in the first embodiment, the buffer 310 is configured to receive the CQI from the downlink channel quality estimation unit 306 and the ACK/NACK information from the ACK/NACK determining unit 308, and to preferentially output the ACK/NACK information if the CQI and the ACK/NACK information are to be transmitted at the same timing (subframe). As an alternative configuration, the mobile station 30 may further include a CQI blocking unit between the downlink channel quality estimation unit 306 and the buffer 310. When the CQI and the ACK/NACK information are to be transmitted at the same timing (subframe), the CQI blocking unit prevents the CQI from being input to the buffer 310 so that the ACK/NACK information is preferentially output from the buffer 310.

As described with reference to FIG. 4B, the buffer 310 may be configured to temporarily store the CQI when the CQI and the ACK/NACK information are to be transmitted in the same subframe and to transmit the CQI in the next subframe following the subframe where the ACK/NACK information is transmitted. Alternatively, the buffer 310 may be configured to transmit the CQI in any one of the second and subsequent subframes after the subframe where the ACK/NACK information is transmitted.

Although the present invention is described above in different embodiments, the distinctions between the embodiments are not essential for the present invention, and the embodiments may be used individually or in combination.

The base station 50 of the first embodiment includes the scheduling and CQI-non-transmission-period-determining unit 510 that stops (or postpones) transmission of data to the mobile station 30 if the number of times when only the ACK/NACK information is transmitted (the CQI is not transmitted) exceeds a predetermined value. Instead of stopping (or postponing) transmission of data, as in the base station 80 of the second embodiment, the scheduling and CQI-non-transmission-period-determining unit 510 may be configured to request the mobile station 30 to transmit the CQI and the ACK/NACK information by multiplexing them in the PUSCH.

The above embodiments may also be expressed as follows:

According to a first aspect of the present invention, a mobile station includes a channel quality estimation unit configured to estimate downlink channel quality based on a signal from a base station and to output the estimated downlink channel quality as channel estimation information; an acknowledgement information determining unit configured to determine whether a downlink data channel from the base station is correctly received and to output the determination result as acknowledgement information; and an acknowledgement information prioritizing unit configured to cause the acknowledgement information to be preferentially transmitted to the base station if transmission timings of the channel estimation information and the acknowledgement information coincide. The acknowledgement information prioritizing unit is connected to the channel quality estimation unit and the acknowledgement information determining unit. When receiving the channel estimation information and the acknowledgement information at the same time, the acknowledgement information prioritizing unit discards the channel estimation information.

According to a second aspect of the present invention, a mobile station includes a channel quality estimation unit configured to estimate downlink channel quality based on a signal from a base station and to output the estimated downlink channel quality as channel estimation information; an acknowledgement information determining unit configured to determine whether a downlink data channel from the base station is correctly received and to output the determination result as acknowledgement information; and an acknowledgement information prioritizing unit configured to cause the acknowledgement information to be preferentially transmitted to the base station if transmission timings of the channel estimation information and the acknowledgement information coincide. The acknowledgement information prioritizing unit is connected to the channel quality estimation unit and the acknowledgement information determining unit. When receiving the acknowledgement information and the channel estimation information at the same time, the acknowledgement information prioritizing unit sequentially outputs the acknowledgement information and the channel estimation information such that the channel estimation information is transmitted after a predetermined number of subframes from when the acknowledgement information is transmitted.

According to a third aspect of the present invention, a base station includes a frame management unit configured to manage frame information indicating a frame where a mobile station transmits, via uplink, acknowledgement information for at least a data channel transmitted via downlink; an allocation information signal generating unit configured to generate uplink radio resource allocation information based on the frame information; and a determining unit configured to determine, based on the frame information, a timing when transmission timings of channel estimation information and the acknowledgement information from the mobile station coincide.

According to a fourth aspect of the present invention, a base station includes a frame management unit configured to manage frame information indicating a frame where a mobile station transmits, via uplink, acknowledgement information for at least a data channel transmitted via downlink; an allocation information signal generating unit configured to generate uplink radio resource allocation information based on the frame information; and a determining unit configured to determine, based on the frame information, a timing when transmission timings of channel estimation information and the acknowledgement information from the mobile station coincide. The determining unit counts the number of times when the transmission timings of the channel estimation information and the acknowledgement information from the mobile station coincide, and if the number of times reaches a predetermined value, outputs a signal requesting to stop or postpone transmission of data.

According to a fifth aspect of the present invention, a base station includes a frame management unit configured to manage frame information indicating a frame where a mobile station transmits, via uplink, acknowledgement information for at least a data channel transmitted via downlink; an allocation information signal generating unit configured to generate uplink radio resource allocation information based on the frame information; and a determining unit configured to determine, based on the frame information, a timing when transmission timings of channel estimation information and the acknowledgement information from the mobile station coincide. When the determining unit determines the timing at which the transmission timings of the channel estimation information and the acknowledgement information from the mobile station coincide, the allocation information signal generating unit generates the uplink radio resource allocation information that causes the mobile station to transmit the channel estimation information and the acknowledgement information via an uplink data channel.

The present international application claims priority from Japanese Patent Application No. 2007-258107 filed on Oct. 1, 2007, the entire contents of which are hereby incorporated herein by reference.

The invention claimed is:

1. A mobile station, comprising:
a channel quality estimation unit configured to estimate downlink channel quality based on a signal from a base station and to output the estimated downlink channel quality as channel estimation information;
an acknowledgement information determining unit configured to determine whether a downlink data channel from the base station is correctly received and to output the determination result as acknowledgement information; and
an acknowledgement information prioritizing unit configured to cause the acknowledgement information to be preferentially transmitted to the base station if transmission timings of the channel estimation information and the acknowledgement information coincide, wherein
the acknowledgement information prioritizing unit is connected to the channel quality estimation unit and the acknowledgement information determining unit; and
when receiving the channel estimation information and the acknowledgement information in a same subframe, the acknowledgement information prioritizing unit is configured to discard the channel estimation information.

2. An uplink transmission method performed by a mobile station, the method comprising the steps of:
estimating downlink channel quality based on a signal from a base station and outputting the estimated downlink channel quality as channel estimation information;
determining whether a downlink data channel from the base station is correctly received and outputting the determination result as acknowledgement information; and
if transmission timings of the channel estimation information and the acknowledgement information coincide, preferentially transmitting the acknowledgement information to the base station, wherein
an acknowledgement information prioritizing unit is connected to a channel quality estimation unit and a acknowledgement information determining unit; and
when receiving the channel estimation information and the acknowledgement information in a same subframe, the acknowledgement information prioritizing unit discards the channel estimation information.

3. A communication system, comprising:
a base station; and
a mobile station communicating with the base station, wherein the mobile station includes:
a channel quality estimation unit configured to estimate downlink channel quality based on a signal from the base station and to output the estimated downlink channel quality as channel estimation information;
an acknowledgement information determining unit configured to determine whether a downlink data channel from the base station is correctly received and to output the determination result as acknowledgement information; and
an acknowledgement information prioritizing unit configured to cause the acknowledgement information to be preferentially transmitted to the base station if transmission timing of the channel estimation information and the acknowledgement information coincide, wherein
the acknowledgement information prioritizing unit is connected to the channel quality estimation unit and the acknowledgement information determining unit; and when receiving the channel estimation information and the acknowledgement information in a same subframe, the acknowledgement information prioritizing unit is configured to discard the channel estimation information.

4. A mobile station, comprising:

a channel quality estimation unit configured to estimate downlink channel quality based on a signal from a base station and to output the estimated downlink channel quality as channel estimation information;

an acknowledgement information determining unit configured to determine whether a downlink data channel from the base station is correctly received and to output the determination result as acknowledgement information; and a transmitting unit configured to transmit the channel estimation information output from the channel quality estimation unit and the acknowledgement information output from the acknowledgement information determining unit via one of a PUCCH and a PUSCH, wherein when transmission timing of the channel estimation information and the acknowledgement information coincide in a same subframe and the PUCCH is used, the transmitting unit preferentially includes the acknowledgement information in the PUCCH; and when transmission timings of the channel estimation information and the acknowledgement information coincide in the same subframe and the PUSCH is used, the transmitting unit includes the channel estimation information in the PUSCH.

5. The mobile station as claimed in claim 4, wherein the transmitting unit is connected to the channel quality estimation unit and the acknowledgement information determining unit; and when the channel estimation information and the acknowledgement information are received in the same subframe, the transmitting unit discards the received channel estimation information.

6. The mobile station as claimed in claim 4, wherein the transmitting unit is connected to the channel quality estimation unit and the acknowledgement information determining unit; and when the acknowledgement information and the channel estimation information are received in a same subframe, the transmitting unit sequentially outputs the acknowledgement information and the channel estimation information such that the channel estimation information is transmitted after a predetermined number of subframes from when the acknowledgement information is transmitted.

7. An uplink transmission method performed by a mobile station communicating with a base station, the method comprising the steps of:

estimating downlink channel quality based on a signal from the base station and outputting the estimated downlink channel quality as channel estimation information;

determining whether a downlink data channel from the base station is correctly received and outputting the determination result as acknowledgement information; and transmitting the channel estimation information and the acknowledgement information via one of a PUCCH and a PUSCH, wherein when transmission timing of the channel estimation information and the acknowledgement information coincide in a same subframe and the PUCCH is used, the acknowledgement information is preferentially included in the PUCCH in the transmitting step; and when transmission timings of the channel estimation information and the acknowledgement information coincide in the same subframe and the PUSCH is used, the channel estimation information and the acknowledgement information are included in the PUSCH in the transmitting step.

8. A communication system, comprising:

a base station; and a mobile station communicating with the base station, wherein the mobile station includes:

a channel quality estimation unit configured to estimate downlink channel quality based on a signal from the base station and to output the estimated downlink channel quality as channel estimation information;

an acknowledgement information determining unit configured to determine whether a downlink data channel from the base station is correctly received and to output the determination result as acknowledgement information; and a transmitting unit configured to transmit the channel estimation information output from the channel quality estimation unit and the acknowledgement information output from the acknowledgement information determining unit via one of a PUCCH and a PUSCH, wherein when transmission timing of the channel estimation information and the acknowledgement information coincide in a same subframe and the PUCCH is used, the transmitting unit preferentially includes the acknowledgement information in the PUCCH; and when transmission timings of the channel estimation information and the acknowledgement information coincide in the same subframe and the PUSCH is used, the transmitting unit includes the channel estimation information in the PUSCH.

* * * * *